United States Patent
Ahuna et al.

(10) Patent No.: US 7,360,690 B1
(45) Date of Patent: Apr. 22, 2008

(54) PRODUCT ADVISOR

(75) Inventors: Nathan K. Ahuna, Overland Park, KS (US); Alison K. Kossover, Overland Park, KS (US); Nancy Maggard, Olathe, KS (US); Vijaykumar Musuvathy, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 436 days.

(21) Appl. No.: 10/999,733

(22) Filed: Nov. 30, 2004

(51) Int. Cl.
*G06K 5/00* (2006.01)

(52) U.S. Cl. .................. 235/380; 235/375; 235/379

(58) Field of Classification Search .............. 235/380, 235/375, 379; 705/14, 26
See application file for complete search history.

(56) References Cited

U.S. PATENT DOCUMENTS

| | | | |
|---|---|---|---|
| 6,684,195 B1 * | 1/2004 | Deaton et al. ............... | 705/14 |
| 6,738,978 B1 * | 5/2004 | Hendricks et al. ............ | 725/35 |
| 2004/0002897 A1 * | 1/2004 | Vishik ........................ | 705/14 |
| 2005/0256778 A1 * | 11/2005 | Boyd et al. .................. | 705/26 |

* cited by examiner

*Primary Examiner*—Karl D. Frech

(57) ABSTRACT

A system is provided for advising in the selection of products to offer customers. The system includes one or more data stores that contain sets of product selection related data including customer information, and product and service related to telecommunications products and services. The system includes an integration layer, a product advisor engine and a profile. The integration layer contains multiple components operable to retrieve data from the appropriate data stores. The product advisor engine analyzes the data retrieved by the integration layer components to select products to offer to customers while the customer is in communication with the customer service representative. The profile is generated by the product advisor engine and includes at least one customer product offering.

34 Claims, 3 Drawing Sheets

PRODUCT ADVISOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the marketing of telecommunications products and services. More particularly, embodiments of the present invention provide for the creation of a customer, product, and service profile that can assist a customer service representative in advising a customer about telecommunications products and services that are suitable for the customer.

BACKGROUND OF THE INVENTION

A telecommunications company might offer thousands of different products, services, and combinations of products and services. For example, a company might offer local, long distance, and wireless telephone service, internet services, multiple calling plans, multiple calling features, multiple billing plans, and multiple physical devices. Customer service representatives or customer advocates who communicate with customers or potential customers typically need to be aware of the products, services, and combinations of products and services that are available to customers.

SUMMARY OF THE INVENTION

An embodiment of the invention is a system for advising in the selection of products to offer customers. The system includes one or more data stores that contain sets of product selection related data including customer information, and product and service related to telecommunications products and services. The system includes an integration layer, a product advisor engine, and a profile. The integration layer contains multiple components operable to retrieve data from the appropriate data stores. The product advisor engine analyzes the data retrieved by the integration layer components to select products to offer to customers while the customer is in communication with the customer service representative. The profile is generated by the product advisor engine and includes at least one customer product offering.

In another embodiment, a system is provided for advising in the selection of telecommunications products to offer customers. The system includes first and second data stores, a metadata, an integration layer, a product advisor engine, and a profile. The first data store contains a first set of telecommunications related data, and the second data store contains second set of telecommunications related data. The metadata maintains data to related to the first and second sets of telecommunications related data. The integration layer contains a first component to retrieve data from the first data store and a second component to retrieve data from the second data store. The product advisor engine uses the metadata for correlation of the first and second sets of telecommunications data and to analyze the data retrieved by the first and second components to select products to offer to customers. The profile is generated by the product advisor engine and includes at least one telecommunications product offering for at a particular customer. The product advisor engine generates the profile responsive to communication with the particular customer.

An alternative embodiment is a method for automatically generating a profile that assists in the selection of telecommunications products for a customer. The method includes a service representative communicating with the customer. The method provides for retrieving, by an integration layer, a first set of telecommunications related information from a first data store and a second set of telecommunications related information from a second data store. The method includes analyzing, by a product advisor engine, the telecommunications related information retrieved by the integration layer. The method includes generating a profile during the communication with the customer by the product advisor engine. The profile including at least one product offering based on the analyzed telecommunications related information. The method also includes using the profile, by the service representative, to advise the customer in selecting products and services while the service representative is in communication with the customer.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

It would be helpful for a customer service representative to be aware of the packages of products and services that are most suited to the particular customer that the service representative is in communication with. Currently, only a limited amount of such information is typically available to service representatives. For example, a service representative dealing with an existing wireless telephony customer might be aware of the type of wireless device the customer uses, the call features the customer has, and the billing plan the customer uses. The service representative might not have access to information about the customer's local or long distance service, internet service, or other services the customer currently uses or might use in the future. Also, the service representative may be unaware of information about the customer's dropped calls, wireless connection quality, telecommunications-related interests, and other potentially useful information.

A customer service representative who has easy access to multiple sources of potentially relevant information about a customer or potential customer may be able to offer the customer a package of products and services that is well suited to the customer's needs and interests. The service representative may also be better equipped to suggest additional products and services to the customer. This can increase both the customer's satisfaction and the telecommunication company's revenues.

In various embodiments, an automated product advisor retrieves customer, product, and service information from multiple sources and correlates the information to create a customer, product, and service profile specific to each customer. The profile assists customer service representatives in tailoring a product and service package that is appropriate for each customer. The profile also makes the service representatives aware of additional products and services that the customer is likely to purchase. As used herein, the term "customer" can refer to either an existing or a potential customer of a telecommunications company.

Figure 1:
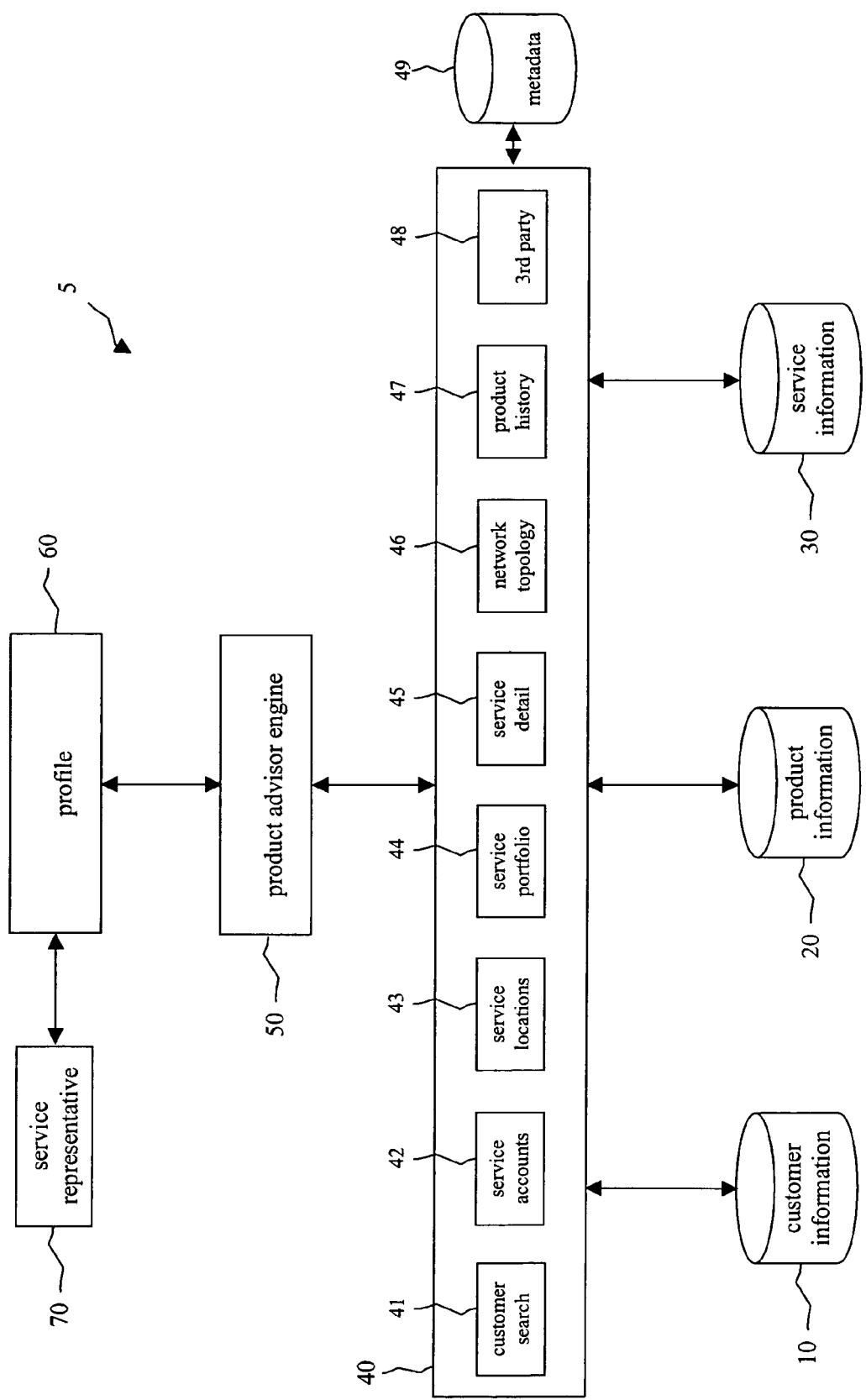
FIG. 1 is a block diagram of an embodiment of an automated product advisor system.

In the embodiment of a product advisor 5 shown in FIG. 1, a data store 10 contains customer information, a data store 20 contains product information, and a data store 30 contains service information. In other embodiments, other types and numbers of data storage media could be present and other types of data could be stored. In the present embodiment, the customer information maintained in the data store 10 may include, but is not limited to, information about the customer, including name and address type information, account number, telephone number, and the products or services that the customer is currently using. Other examples of customer information that may be stored in the data store 10 include information obtained about the customer from third parties, such as surveys, mailing lists, or elsewhere. Customer information may also be obtained from the customers activities, such as information captured when the customer inquires, responds to promotions, or otherwise communicates with the telecommunications provider or other, such as via a web site or customer service call. For example, when the customer selects a web site promotion or calls about a service problem or inquiry into changing service, this information may be stored in the data store 10 and used by the present system. All or portion of the information about the customer's activities or third party obtained information may be kept in the other or separate data stores and correlated as needed or desired.

The product information maintained in the data store 20 may include but is not limited to, information about the products and services offered by, for example, the telecommunications service providers. The products may includes telephony and other devices, local and/or long-distance telephone service, internet service, push-to-talk and location based services, and other telecommunications related products and services. The service information maintained in the data store 30 may include, but is not limited to, usage and other telecommunication information related to each customer. Such usage information may include where the customer is located when initiating or receiving calls and the location of the called or calling parties, the time of day and week when the customer uses the phone or device, usage volume, dropped calls, and other telecommunication related service information. In other embodiments, other information or combinations may be provided or the information may be stored or arranged differently.

An integration layer 40 pulls data from the data stores 10, 20, and 30. The integration layer 40 consists of a customer search engine 41, service accounts information retrieval 42, service locations information retrieval 43, service portfolio information retrieval 44, service detail information retrieval 45, network topology information retrieval 46, product history information retrieval 47, and third-party provided information retrieval 48.

The customer search engine 41 retrieves customer-related information such as geographic and demographic data. For example, the customer search engine 41 might retrieve information about all customers who belong to a particular demographic group and who live in a particular geographic area. The customer search engine 41 might also retrieve information on customer behavior such as the web sites the customer has visited, questions a customer has asked a service representative by telephone or in person at a retail store, a customer's usage patterns for existing products and services, and other behavior-related data.

Service accounts information retrieval 42 allows retrieval of a customer's account-related information. For example, a single customer might have multiple sub-accounts under a single main account. Billing information and other data related to all of the accounts can be retrieved by service accounts information retrieval 42. If information on a customer's accounts with competing telecommunications companies is available, that information might be retrieved also.

Service locations information retrieval 43 provides information on the locations of a customer's accounts. For example, for a business with multiple locations, information on all of the locations might be retrieved.

Service portfolio information retrieval 44 allows retrieval of information on a customer's existing products and services. This can include physical devices such as wireless telephones as well as service packages, calling plans, and billing information.

Service detail information retrieval 45 refers to a customer's usage details. This might include data such as the towers that handled a particular wireless call, the quality of service for a call, and the customer's behavior patterns. For example, service detail information retrieval 45 might indicate that a customer tends to use a wireless telephone in a certain geographic area but that call quality tends to be substandard in some sections of that area.

Network topology information retrieval 46 deals with the physical components of the company's telecommunications network such as the locations of towers and the types of connectivity between the towers. This information might be useful in tailoring a product offering to a customer based on the type of equipment that is available to the customer. For example, a high value customer might not be offered a service requiring experimental equipment that might not be able to provide consistently high quality service.

Product history information retrieval 47 provides information on products and services a customer has used in the past, both with the current telecommunications company and previous telecommunications companies. This information might be obtained from internal research and can help a telecommunications company determine its share of a customer's overall telecommunications business and how that share can be increased.

Third-party provided information retrieval 48 refers to any other customer-related information that a telecommunications company obtains from sources other than its own internal means. This information, which might be obtained from trade shows, retailers, and other sources, can also help a telecommunications company determine how its share of a customer's overall telecommunications business can be increased.

In an embodiment, a metadata data store 49 may be provided that contains metadata related to the data stored in the components 41 through 48. For example, one of the components 41 through 48 might contain a customer's long distance billing information and another of the components 41 through 48 might contain information about the quality of the same customer's wireless calls. The metadata in the metadata data store 49 might record the fact that the same customer is being referred to in both cases.

In previously existing systems that might use individual data retrieval elements similar to the components 41 through 48 of the integration layer 40, the elements might have a limited amount of intelligence to interpret the particular type of data that they are intended to handle. Such elements might also have a limited ability to communicate among themselves to share information. Also, there is typically no central unit that can correlate and interpret data from multiple such elements in order to discover relationships among data from the different elements.

In an embodiment, information that the integration layer 40 extracts from the data stores 10, 20, and 30 is correlated and interpreted by a product advisor engine 50. The product advisor engine 50 combines geographic and demographic data about a customer, data about the customer's behavior, and product and service information to create a customer, product, and service profile 60. The profile 60 can display correlated data from multiple sources that might indicate products and/or services that are appropriate for the customer or that the customer is likely to purchase. A customer advocate or service representative 70 can observe the profile 60 and gain knowledge that may be useful in assisting the customer.

For example, information received from a customer regarding the time a dropped call occurred might be stored in a different data store from automatically recorded information about the customer's location at that time. The product advisor engine 50 might correlate the two pieces of information to determine when and where a dropped call occurred. A service representative 70 observing this information in the customer's profile 60 might be able to offer the customer a service plan that is likely to prevent such dropped calls in these locations.

In another example, a customer might call a service representative 70 with a question about a long-distance bill. The service representative 70 might look at the customer's profile 60 created by the product advisor engine 50 and observe that the customer has internet service with another provider and wireless service with yet another provider. The profile 60 might also show that the customer has recently visited the telecommunications company's web site seeking information about the telecommunications company's wireless telephony and wireless networking devices. The service representative 70 might use this information to offer the customer a package of long-distance, wireless telephony, and wireless networking services that use a device in which the customer has exhibited an interest.

Figure 2:
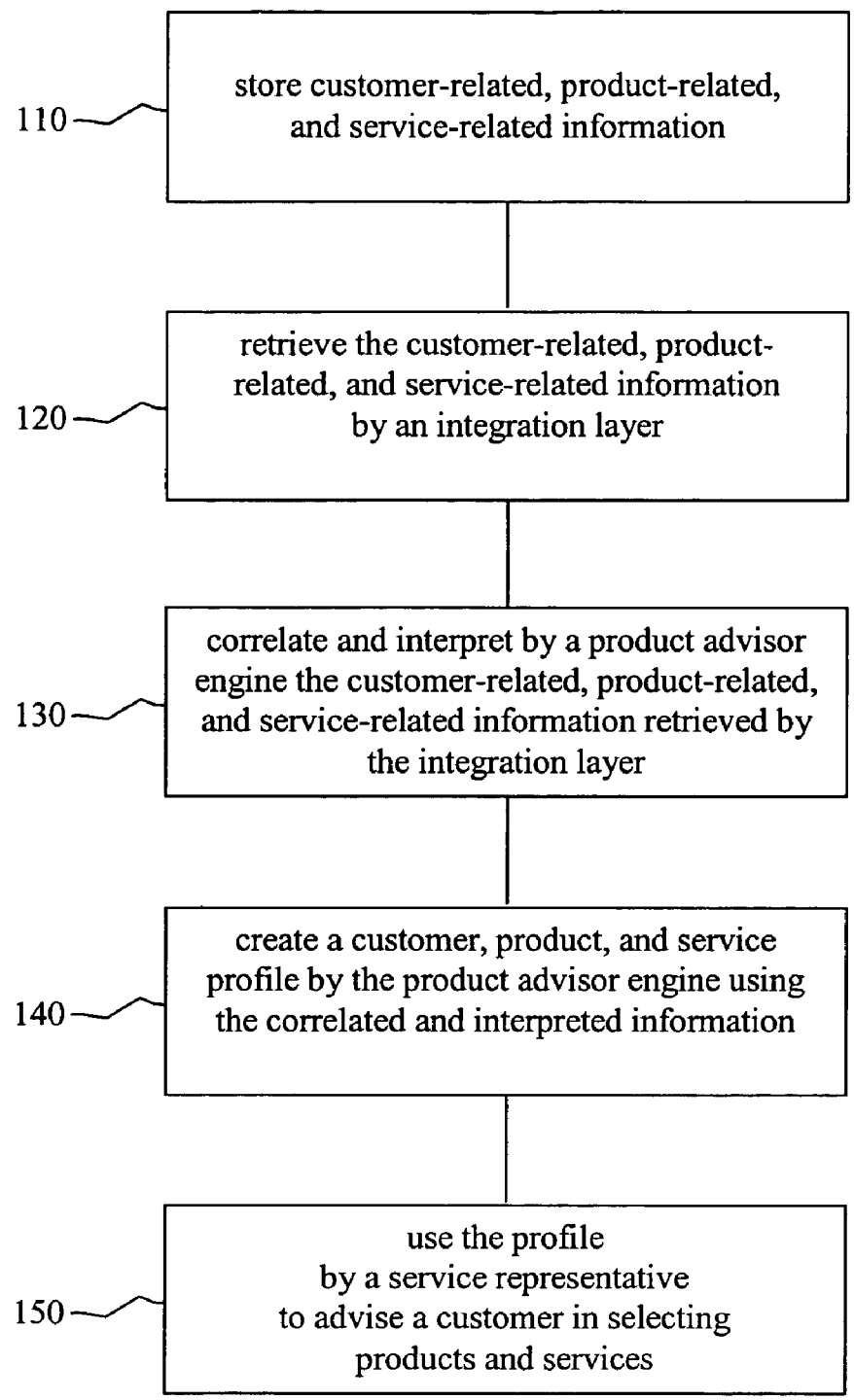
FIG. 2 is a flowchart of a method for creating a customer, product, and service profile using an automated product advisor.

FIG. 2 illustrates an embodiment of a method that might be used in creating a profile that a service representative might use while advising a customer about telecommunications products and services. In box 110, customer-related, product-related, and service-related information is stored in data stores or other data storage media. The data might come from sources that might include, but are not limited to, a telecommunications company's internal products and services catalog, customer account information, replies to questions from service representatives, internally and externally generated research, trade shows, and other sources.

In box 120, an integration layer retrieves the customer-related, product-related, and service-related information. The information layer can consist of a customer search engine, service accounts information retrieval, service locations information retrieval, service portfolio information retrieval, service detail information retrieval, network topology information retrieval, product history information retrieval, and third-party provided information retrieval.

In box 130, a product advisor engine correlates and interprets the customer-related, product-related, and service-related information that was retrieved by the integration layer. The product advisor engine can find relationships among the data that would not be visible to any single component alone within the integration layer. In one embodiment, the product advisor engine is programmed to use the metadata data store 49 to mine and analyze data in from the data stores 10, 20 and 30 and correlate data related to a particular customer or customers with product or service offerings. The product advisor engine may have rules, for example, regarding the specific data to mine, and related to the correlation of data. The rules may be continually modified and improved based on feedback from customer service representative and the offerings that are accepted or purchased by the customer.

In box 140, the product advisor engine creates a customer, product, and service profile using the correlated and interpreted information. The profile can display data from multiple sources that might indicate products and/or services that are appropriate for the customer or that the customer is likely to purchase.

In box 150, a service representative uses the profile to advise a customer in the selection of products and services. The profile can assist the service representative in creating the product and service package that is most appropriate for each customer. The profile can also make the service representative aware of additional products and services that the customer is likely to purchase.

In one embodiment, the profile may present the various offerings along with the basis for the offering. For example, during a telephone call from the customer related to a billing inquiry, the profile is operable to generate a home internet access offering which is presented along with the date that the customer recently visited the company's web site and viewed promotions about home internet access. A plurality of offerings may be generated by the profile for each customer and may be arranged in an easily readable and organized manner. The offerings may be provided in various orders, such as the likelihood of the customer accepting the offering. For example, a first product offering related to a more recent customer activity may be ordered higher or labeled of more important, than a second offering related to an older customer activity or generic promotions of a new product or service.

In another embodiment, the disclosed system may be operable for push and pull capability, such as correlating appropriate data and pushing a related product offering.

Also, in some instances an offer may be presented prior to any action on the part of customers or users, such as when a customer first accesses the company's web site. Also, the system may use location-based or other services, for example, to identify customers in an airport and correlate this information to produce a proactive interaction push of an offer, such as to play a game for a free or discounted download rate. Other examples of retrieving information correlated to push offering using the present system will readily suggest themselves to one skilled in the art based on the present disclosure.

Figure 3:
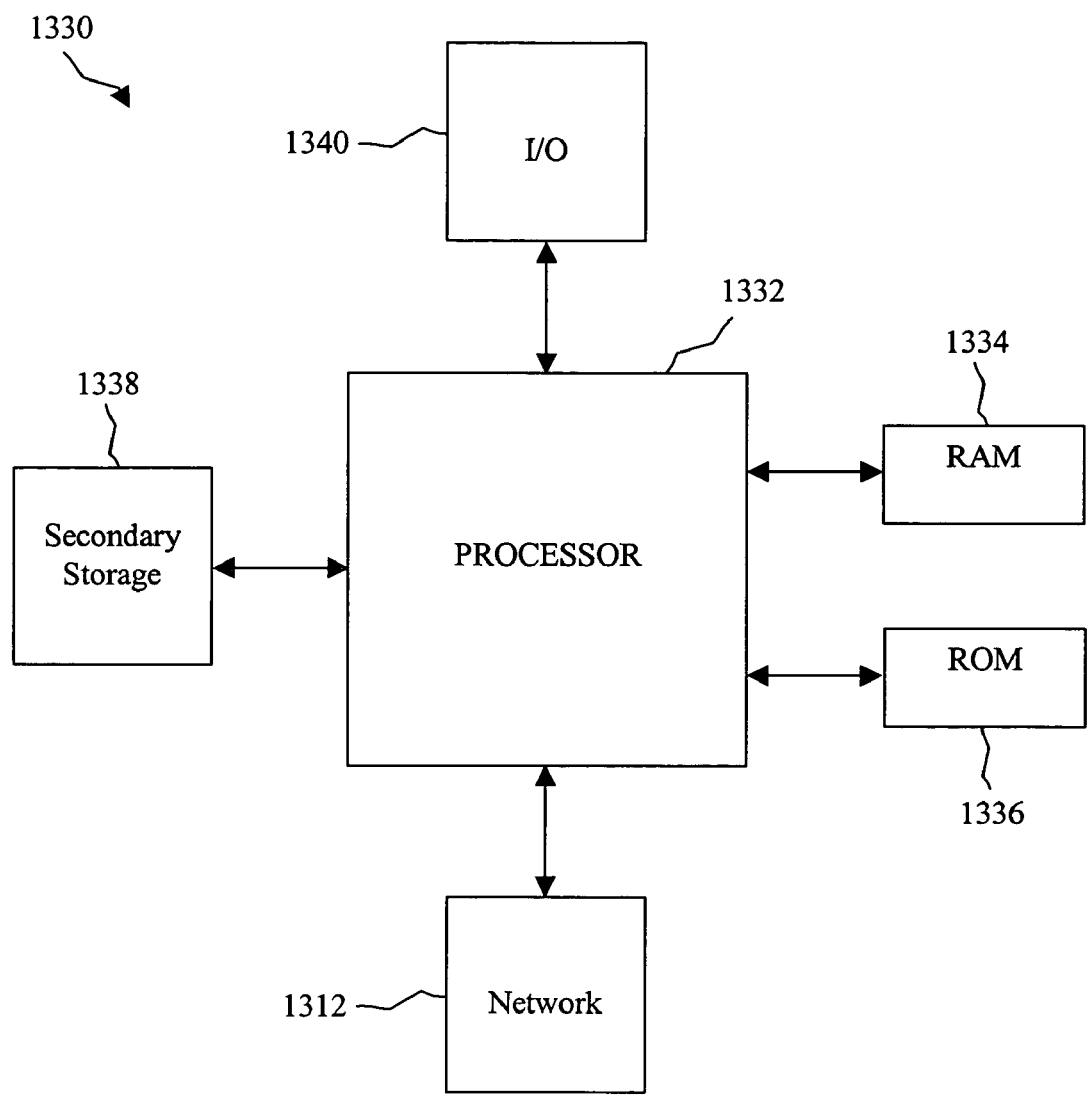
FIG. 3 is a block diagram of an exemplary computing system.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) 1340 devices, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O 1340 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from the network, or might output information to the network in the course of performing the above-described method steps. Such information, which is often represented as a sequence of instructions to be executed using processor 1332, may be received from and outputted to the network, for example, in the form of a computer data signal embodied in a carrier wave.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312.

While several embodiments have been provided in the present disclosure, it should be understood that the Product Advisor may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for advising in the selection of products to offer customers, the system comprising:
    a first data store that contains a first set of product selection related data including customer information;
    a second data store that contains a second set of product selection related data including service information;
    an integration layer containing a first component operable to retrieve data from the first data store and a second component operable to retrieve data from the second data store;
    a product advisor engine to analyze the data retrieved by the first and second components to select products to offer to customers; and
    a profile generated by the product advisor engine including at least one customer product offering;
    wherein the product advisor engine further analyzes customer activities information and third party obtained information.

2. The system of claim 1, wherein the first and second components are separate systems, such that the first component is inoperable for communication with the second set of product selection related data and the second component is inoperable for communication with the first set of product selection related data, and wherein the integration layer is operable to promote communication of both the first and second set of product selection related data for analysis by the product advisor engine.

3. The system of claim 1, wherein the at least one product offering in the profile is a customized profile generated for a particular customer.

4. The system of claim 1, above wherein product advisor engine the profile responsive to communication with a particular customer.

5. The system of claim 4, wherein the first data store maintains the first set of product selection related data which includes personal customer data.

6. The system of claim 5, wherein a third data store maintains a third set of product selection related data including product data.

7. The system of claim 6, wherein the product advisor engine is operable to generate the profile customized for each customer based on analysis of the customer and product data.

8. The system of claim 1, wherein the product offering is selected from a group consisting of a wireless telephone service, a local telephone service, a long distance telephone service, an internet access service.

9. The system of claim 1, wherein the product offering is an add-on service to an existing service selected from a group of existing services consisting of a wireless telephone service, a local telephone service, a long distance telephone service, an internet access service.

10. The system of claim 1, wherein the first set of product selection related data includes customer information selected from a group consisting of a previous customer inquiry information, a customer usage history information, a customer billing history information.

11. The system of claim 1, wherein the integration layer includes a customer search engine component, a service accounts information retrieval component, service locations information retrieval component, service portfolio information retrieval component, service detail information retrieval component, network topology information retrieval component, product history information retrieval component, and third-party provided information retrieval component.

12. The system of claim 1, wherein the product advisor engine further analyzes survey information about the customer.

13. The system of claim 1, wherein the product advisor engine further analyzes web site information obtained during customer browsing.

14. The system of claim 13, wherein the web site information is related to the customer browsing a telecommunication provider's web site.

15. The system of claim 1, wherein the product advisor engine further analyzes customer information obtained by a customer service system during a communication with the customer.

16. The system of claim 15, wherein communication with the customer is further defined as a complaint call by the customer to a telecommunications provider.

17. A system for advising in the selection of telecommunications products to offer customers, the system comprising:
a first data store that contains a first set of telecommunications related data including customer data;
a second data store that contains a second set of telecommunications related data including service data;
a metadata maintaining data related to the first and second sets of telecommunications related data;
an integration layer containing a first component operable to retrieve data from the first data store and a second component operable to retrieve data from the second data store;
a product advisor engine using the metadata for correlation of the first and second sets of telecommunications data and to analyze the data retrieved by the first and second components to select products to offer to customers; and
a profile generated by the product advisor engine including at least one telecommunications product offering for at a particular customer, the product advisor engine generating the profile responsive to communication with the particular customer.

18. The system of claim 17, wherein the first and second components are separate systems each selected from a group consisting of one of a customer service system, a billing system, a usage system.

19. The system of claim 17, wherein the first data store that contains the first set of telecommunications related data selected from a group consisting of a system maintaining information on internet related services, a system maintaining information related to local/long distance telephone related services, and a system maintaining information related to wireless telephone service.

20. The system of claim 17, wherein the telecommunications product offering is an add-on service to an existing service selected from a group of existing services consisting of a wireless telephone service, a local telephone service, a long distance telephone service, an internet access service.

21. The system of claim 17, wherein the first set of telecommunications related data includes customer information selected from a group consisting of a previous customer inquiry information, a customer usage history information, a customer billing history information.

22. The system of claim 17, wherein the integration layer includes a customer search engine component, a service accounts information retrieval component, service locations information retrieval component, service portfolio information retrieval component, service detail information retrieval component, network topology information retrieval component, product history information retrieval component, and third-party provided information retrieval component.

23. The system of claim 17, wherein the product advisor engine analyzes call location related information of the service data.

24. The system of claim 17, wherein the call location related information of the service data is selected from a group includes a geographic location of a tower where connecting the customer call, a geographic location of the customer during the call, a geographic location of other parties connected to the call.

25. The system of claim 17, wherein the product advisor engine analyzes dropped call information.

26. A method for automatically generating a profile that assists in the selection of telecommunications products for a customer, the method comprising:
a service representative communicating with the customer;
retrieving, by an integration layer, a first set of telecommunications related information from a first data store and a second set of telecommunications related information from a second data store;

analyzing, by a product advisor engine, the telecommunications related information retrieved by the integration layer;

generating a profile during the communication with the customer by the product advisor engine, the profile including at least one product offering based on the analyzed telecommunications related information; and using the profile by the service representative to advise the customer in selecting products and services while the service representative is in communication with the customer.

27. The method of claim 26, wherein creating the profile includes creating a customer profile, a products profile, and a services usage profile.

28. The method of claim 26, wherein the telecommunications product offering is an add-on service to an existing service selected from a group of existing services consisting of a wireless telephone service, a local telephone service, a long distance telephone service, an internet access service.

29. The method of claim 26, wherein the telecommunications product offering is an new service selected from a group of existing services consisting of a wireless telephone service, a local telephone service, a long distance telephone service, an internet access service.

30. The method of claim 26, wherein the communication with the customer is further defined as customer initiated.

31. The method of claim 26, wherein the service representative is further defined as a customer service representative of a telecommunications provider.

32. The method of claim 26, wherein service representative is further defined as a customer service representative of a reseller of products of a telecommunications provider.

33. The method of claim 26, wherein generating the profile includes determining a service usage of the customer;

matching customer inquires and service usage related to a particular telecommunications product with a particular telecommunication product offering; and including the particular telecommunication product as one of the product offerings in the profile.

34. The method of claim 26, wherein the integration layer includes a customer search engine, service accounts information retrieval component, service locations information retrieval component, service portfolio information retrieval component, service detail information retrieval component, network topology information retrieval component, product history information retrieval component, and third-party provided information retrieval component.

* * * * *